(12) United States Patent
Kato

(10) Patent No.: US 6,716,146 B2
(45) Date of Patent: Apr. 6, 2004

(54) TOOL MAGAZINE

(75) Inventor: Heizaburo Kato, Shizuoka (JP)

(73) Assignee: Sankyo Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/933,282

(22) Filed: Aug. 20, 2001

(65) Prior Publication Data

US 2002/0043138 A1 Apr. 18, 2002

(30) Foreign Application Priority Data

Aug. 23, 2000 (JP) .................................. 2000-252034

(51) Int. Cl.⁷ ............................................... B23Q 3/157
(52) U.S. Cl. ........................... 483/58; 483/59; 483/56; 483/32; 483/37; 483/63; 483/66; 83/552; 74/813 R
(58) Field of Search ..................... 483/58, 59, 63, 483/64, 66, 67, 68, 32, 60, 62, 37; 414/736; 211/1.56, 1.51, 1.5; 83/552; 475/331, 337; 74/813 R

(56) References Cited

U.S. PATENT DOCUMENTS

| | | | |
|---|---|---|---|
| 3,355,797 A | | 12/1967 | Lohneis |
| 3,987,909 A | | 10/1976 | Piotrowski |
| 4,087,901 A | * | 5/1978 | Lohneis et al. ............. 483/8 |
| 4,119,213 A | * | 10/1978 | Sato et al. ................ 483/61 |
| 4,817,267 A | * | 4/1989 | Hitomi ..................... 483/44 |
| 4,976,180 A | * | 12/1990 | Otto ........................ 83/552 |
| 5,133,128 A | * | 7/1992 | Katayama et al. ........ 483/44 |
| 5,299,477 A | * | 4/1994 | Miyajima ................. 483/28 |
| 5,337,623 A | | 8/1994 | Huang et al. |
| 5,702,336 A | * | 12/1997 | Kameyama .............. 483/56 |
| 5,816,987 A | * | 10/1998 | Yan et al. ................. 483/38 |
| 5,882,285 A | | 3/1999 | Seto et al. |

FOREIGN PATENT DOCUMENTS

| | | |
|---|---|---|
| DE | 219708 | 3/1985 |
| DE | 29508029 | 8/1995 |
| JP | 3-89922 | 3/1991 |
| JP | 6-90163 | 4/1994 |
| JP | 6-245591 | 10/1994 |
| JP | 7-232089 | 8/1995 |
| JP | 7-256454 | 10/1995 |
| JP | 7-299263 | 10/1995 |
| JP | 8-257949 | 9/1996 |
| JP | 8-304048 | 10/1996 |
| JP | 9-217671 | 8/1997 |
| JP | 9-257949 | 9/1997 |
| JP | 10-180518 | 6/1998 |
| JP | 10-238954 | 8/1998 |
| JP | 10-274075 | 9/1998 |
| WO | WO 98/38006 | 9/1998 |

\* cited by examiner

*Primary Examiner*—Erica Cadugan
*Assistant Examiner*—Dana Ross
(74) *Attorney, Agent, or Firm*—Harness, Dickey & Pierce, P.L.C.

(57) ABSTRACT

A automatically indexing tool magazine, of the type attached to machining centers that incorporate an automatic tool change function, able to hold a relatively large number of tools in a compact space as means of improving space efficiency. The tool magazine is comprised of a rotatable main table and multiple sub-tables rotatably attached to the main table in a uniformly spaced radial pattern, each sub-table being equipped with a number of tool pots likewise arranged in a uniformly spaced radial pattern. The tool pots serve as containers into which machining tools can be inserted or removed. The main table and sub-tables are rotatably indexed by means of respective main table and sub-table indexing mechanisms. The tool pot holding the tool designated for removal is transported to a tool removal position through the rotational indexing movement of the main table and appropriate sub-table.

3 Claims, 14 Drawing Sheets

TOOL MAGAZINE

BACKGROUND OF THE INVENTION

1. Field of the Invention

The invention relates to a multiple tool holding automatically indexing tool magazine used by a metal processing machine of the type that incorporates an automatic tool change function, specifically, a tool magazine that can be used to store a greater number of tools in a smaller space than conventional tool magazines.

2. Description of the Related Art

Japanese Unexamined Patent Application No. 2000-94252 teaches a tool magazine that performs the same automatic tool indexing function as the invention. The tool magazine put forth in the aforesaid patent is comprised of multiple tool holding pots radially arranged on the outer surface of a round table-like structure. Because the tool holding pots are arranged in a circular pattern, the size of the entire magazine increases as the number of tools it is designed to hold increases, thus causing the tool magazine to occupy more space in relation to the number of tools held therein.

The following structure has been used in an effort to reduce the space occupied by the aforesaid type of tool magazine. Two rotating sprockets are oriented at a mutually respective distance so as to establish a space there between, and a chain is placed over both sprockets and tensioned adequately so as not to slip between the sprockets, thus forming a movable oval shaped track structure onto which tool holding pots are attached at specific intervals. This oval shaped track structure traverses as means of bringing the desired tool pot (and tool contained therein) to a tool removal station. A pick-up device then extracts the tool and attaches it to the metal processing machine.

There is a problem, however, in that the number of tool pots that can be installed to the aforesaid oval track structure is limited by the length of that structure, thus necessitating the use of multiple tool magazines in cases where it is desired to use more tools than a single magazine can accommodate, and further necessitating the need for a relatively large space to accommodate these multiple tool magazines. Moreover, the tool magazine control system becomes more complicated when multiple tool magazines are used.

Furthermore, when the track and tool pots are in motion, all of the tools must be moved in order to bring one tool to the exchange position. As a result, there is a large amount of inertia to be overcome as the drive system must move all of the tools when a tool indexing operation is executed. This large amount of inertia results in the generation of excessive shock when the tool magazine starts and stops, thus making it difficult to precisely control the start-stop indexing action of the tool magazine at high speeds.

SUMMARY OF THE INVENTION

The invention proposes an automatically indexing tool magazine capable of transporting any one tool within a group of multiple tools to a specific tool pickup position, said tool magazine being structured so as to accommodate a large number of tools in a relatively small space and quickly transport tools to the tool removal station with a minimum inertial effect.

The tool magazine put forth by the invention is comprised of an indexing main table rotatably installed to a support frame, multiple indexing sub-tables rotatably installed in a radial pattern at uniform intervals on the aforesaid main table, multiple detachable tool pots installed in a radial pattern at uniform intervals on the aforesaid sub-tables, a main indexing mechanism installed to the aforesaid main table with the purpose of bringing the designated sub-table to the tool exchange station, and a sub-indexing mechanism installed to the aforesaid sub-table with the purpose indexing the sub-table to bring the designated tool pot to the tool exchange station.

This structure, in which multiple tool pots are installed to sub-tables which are in turn installed to a main table, not only allows a larger number of tools to be carried by the tool magazine, it reduces the overall size of the tool magazine to allow for more efficient space utilization at the site where the metal processing machine is used.

Moreover, this structure, in which groups of tools are carried separated by multiple sub-tables, reduces start-stop inertia by allowing the main and sub-tables to move independently only to the extent of the required indexing angle. The result is a smoother start-stop action of the main and sub-tables which in turn allows for faster indexing speed that has the effect of reducing tool transport time as means of increasing overall operating efficiency of the metal processing machine.

The aforesaid main indexing mechanism may be comprised of a main input shaft, a main output shaft used to transfer power to the main table, and cam driven reduction gearing that provides a rotational indexing control function based on an angular phase change command signal output from a rotational angle detection means installed at the aforesaid main input shaft or main output shaft. In the same manner, the aforesaid sub-indexing mechanism is comprised of a sub-input shaft, a sub-output shaft used to transfer power to the sub-table, and roller gear cam driven reduction gearing that provides a rotational control function based on an angular phase change command signal output from a rotational angle detection means installed at the aforesaid sub-input shaft or sub-output shaft.

The aforesaid structure is able to simultaneously index the main output shaft and sub-output shaft to the desired rotational angle, and to achieve a smooth rotational action of the main and sub-tables that has the effect of suppressing vibrations generated by the moving tool magazine that can be harmful to the machining process. Tool magazine service life is also extended due to the reduction in abrasional wear.

The aforesaid main and sub-indexing mechanisms may also be structured as a cam driven indexing mechanism that capable of imparting a smooth rotating action to the main and sub-tables to suppress vibrations generated by the moving tool magazine and to reduce abrasional wear within the tool magazine.

It is advantageous to manage the tool positions in the tool magazine by applying numbers to the main table and sub-tables so as to establish a matrix-type memory positional control system. In this way the position of each stored tool can be known in real time, thus allowing for an accurate positioning operation the next time that the tool is needed.

Moreover, additional tool pots may be installed to the main table between the sub-tables, thus further increasing the tool holding capacity of the tool magazine.

The aforesaid main indexing mechanism may incorporate a main output shaft as means of supplying rotational torque to the main table, and the sub-indexing mechanism may incorporate a sub-output shaft as means of supplying rotational torque to the sub-tables. Both of these main and sub-indexing mechanisms may be installed within a common housing in which the main output shaft resides within the sub-output shaft on the same rotational axis, or in which the sub-output shaft resides within the main output shaft on the same rotational axis as means of reducing the size of the main and sub-indexing mechanisms.

Tool transport time is significantly reduced because the main and sub-indexing mechanisms operate simultaneously to position the main and sub-tables.

A planetary gearset may be installed between the sub-indexing mechanism and sub-tables as means of transferring power from the sub-indexing mechanism to each sub-table, thus allowing a single sub-indexing mechanism to rotationally drive all sub-tables.

The aforesaid planetary gearset may be comprised of a centrally located rotating sun gear, a planetary gear fixedly installed to the circumference of each sub-table, and power transferring idler gears positioned between the aforesaid sun gear and planetary gears as means of transferring power between them. The aforesaid sun gear and planetary gears may be made to the same dimensions as means of maintaining a uniform rotating speed of both gears. In this case, as the rotational angle phase change of the sun and planetary gears is identical, the rotational angle of each sub-table can be easily controlled through that rotational angle of the sun gear.

The automatic tool removal position of the sub-table may be established by a structure through which the sub-indexing mechanism rotationally indexes only one sub-table without rotating the other sub-tables.

In this case, a sub-table connecting device is used at the indexed sub-table to enable the sub-indexing mechanism to be connected or disconnected to the sub-table as means of rotatably indexing only one sub-table.

The use of the aforesaid sub-table connecting device provides for a structure through which non-designated sub-tables (that is, sub-tables that are not holding the tool designated for indexing) are not rotated as a result of their being disconnected from the sub-table indexing mechanism, thus reducing rotating weight and the resulting undesirable inertial effect.

A reciprocating drive mechanism may be provided to move the sub-indexing mechanism up to the sub-table (when that sub-table is to be rotatably indexed by the sub-indexing mechanism) as means of connecting the sub-indexing mechanism to the sub-table. Furthermore, a coupling mechanism may be provided to temporarily connect the sub-indexing mechanism to the sub-table as means of transferring power from the sub-indexing mechanism to the sub-table.

This structure, by which the sub-indexing mechanism is able to connect to or disconnect from the sub-table, provides means whereby the sub-table and sub-indexing mechanism can be connected or disconnected as desired.

The aforesaid reciprocating drive mechanism may incorporate a cam drive unit as means of converting the rotational movement of the sub-indexing mechanism to a linear reciprocating movement, thus allowing the sub-indexing mechanism to generate both rotational torque and linear reciprocating movements.

The aforesaid reciprocating drive mechanism may be equipped with a slide unit as means of guiding the aforesaid reciprocating movement of the sub-indexing mechanism. This slide unit may be comprised of a slide frame that supports the reciprocating sliding movement of the sub-indexing mechanism, and a slider part installed to the sub-indexing mechanism and movably connected to the aforesaid slide frame as means of imparting a smooth and precise sliding action to the sub-indexing mechanism.

The aforesaid cam drive unit may incorporate a rotating cam powered by the rotational torque supplied to the sub-indexing mechanism, a cam profile as means of converting the aforesaid rotational torque to a linear reciprocating motion output by the sub-indexing mechanism, and a cam follower attached to the slide frame, said cam follower being in constant contact with the aforesaid rotating cam as means of generating the aforesaid reciprocating motion.

The aforesaid coupling mechanism may be comprised of releasable joint formed by the mutual interconnection of an angular protruding nub and corresponding recessed female part, said joint providing means of positionally aligning the sub-table with the sub-indexing mechanism.

The sub-indexing mechanism may be installed at the tool removal station and incorporate a sub-input shaft and sub-output shaft. In order to provide a releasable connection to the sub-table indexed at the tool removal position, a compound cam mechanism may be employed as means of converting the rotational movement from the sub-input shaft to the compound rotational and reciprocating movement of the sub-output shaft that rotationally indexes the sub-table.

The aforesaid compound cam mechanism utilizes an axially movable splined joint, located between the sub-input and sub-output shafts, as means of connecting a rotatable turret part to the sub-output shaft so as to allow the turret to move in the axial direction in relation to the sub-output shaft. The compound cam structure further utilizes a first cam mechanism as means of converting the rotational movement of the sub-input shaft to the rotational movement of the sub-output shaft; and a second cam mechanism, installed between the sub-input shaft and sub-output shaft, as means of converting the rotational movement of the sub-input shaft to the reciprocating movement of the sub-output shaft.

It is desirable to equip the main table with a radial indexing mechanism, installed at each of the sub-tables, as means of maintaining each sub-table at an indexed position. This radial indexing mechanism will improve the tool exchange operation by allowing each sub-table to always be oriented with a tool pot accurately aligned with the tool exchange station. The aforesaid radial indexing mechanism will also provide for precise connecting action of the reciprocating drive connector to the sub-table, and will also prevent the sub-tables from vibrating when the main table is turning. As a result, the position of the tool pots can always be maintaining at desired points and tools can be easily replaced even when a sub-table is not aligned with the tool removal station.

The aforesaid radial indexing mechanism incorporates a radial indexing structure fixedly installed to the sub-table, and a stop position control device, installed to the main table, that connects with the aforesaid radial indexing part to maintain the rotational position of the sub-table.

The aforesaid radial indexing structure incorporates a connecting part radially positioned in relation to each tool pot as means of establishing an accurate stop position for each tool pot.

The aforesaid position stop position control device incorporates a sliding block able to move toward and against the aforesaid connecting part, and a compressible element installed to the main table in a manner as to provide a force to move the aforesaid sliding block toward and against the aforesaid connecting part.

The tool magazine put forth by this application may also incorporate multiple moving track-type tool holders on which tools may be held instead of on the aforesaid sub-tables. That is, the tool magazine may also be comprised of an indexing main table rotatably installed to a support frame, multiple indexing sub-tables rotatably installed in a radial pattern at uniform intervals on the aforesaid main table, a drive part fixedly installed to each sub-table so as to revolve together with the sub-table, a driven part rotatably installed to the main table, a moving belt part installed around and between the aforesaid drive part and driven part, multiple tool pots installed on the aforesaid moving belt part at uniform intervals, an indexing mechanism connected to the main table with the purpose of rotating the main table to bring a designated belt part to the tool exchange station, and a sub-table indexing mechanism, attached to a sub-table, that has the purpose of rotating the aforesaid moving belt part to bring the designated tool pot to the tool removal station.

The advantage of this structure is that it can increase the capacity of the tool magazine without increasing the magazine's overall size.

DESCRIPITON OF PREFERRED EMBODIMENTS

Figure 1:
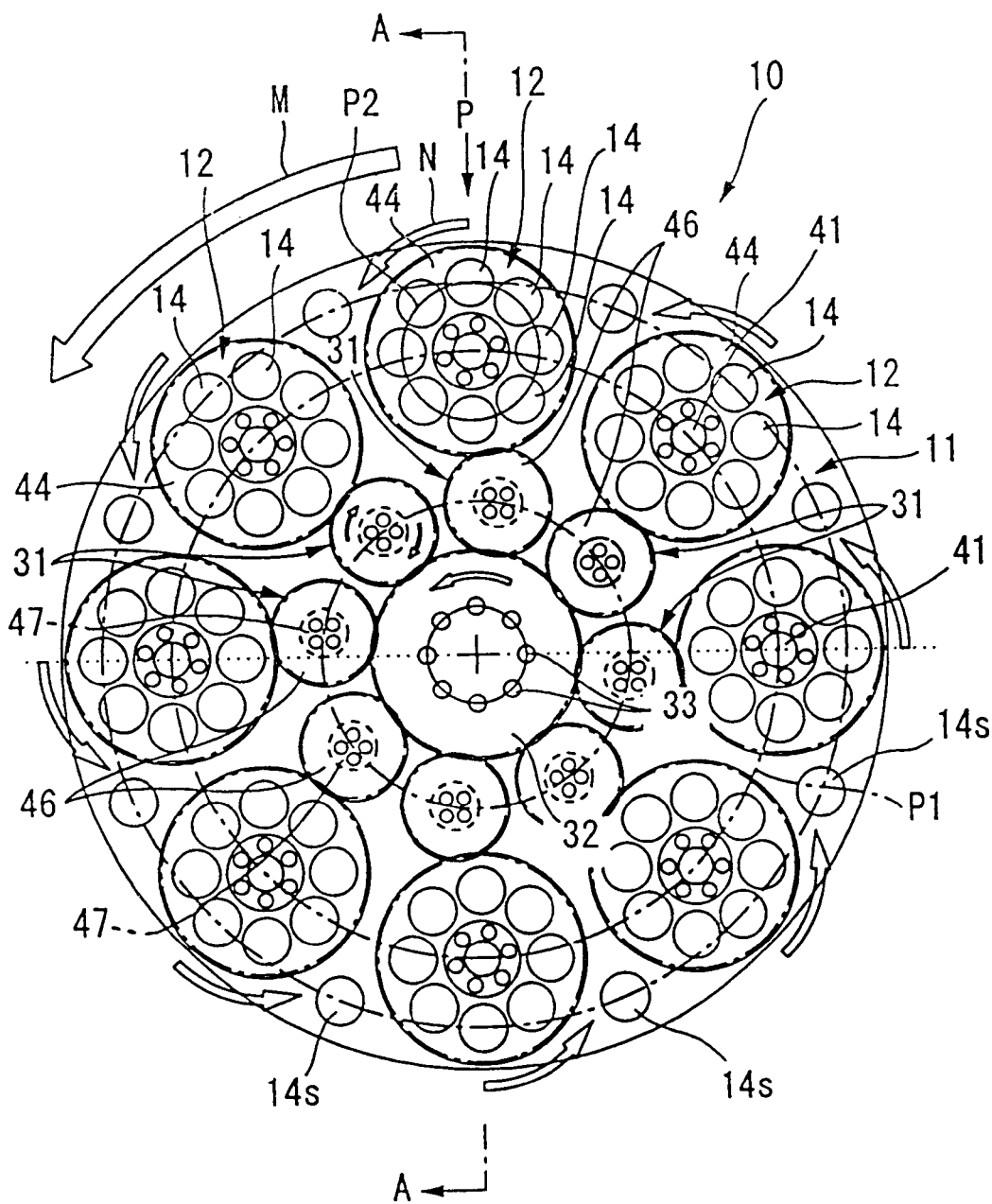
FIG. 1 shows a plan view of the first embodiment of the invention.

FIGS. 1 through 7 present a first embodiment of the invention. Tool magazine 10 is a round table-type structure, and as FIGS. 1 and 2 demonstrate, is comprised of disc-shaped main table 11 to which multiple disc-shaped sub-tables 12 are installed in a radial pattern at uniform intervals on a radial arc shown as P1. In this embodiment, a total of eight sub-tables are mounted to main table 11. Tool pots 14 are installed to each sub-table on radial arc P2 as means of storing various machining tools on the tool magazine. In this embodiment each sub-table is capable of holding up to eight tools. The main table and sub-tables can be rotated to the desired angular phase, through the use of an indexing mechanism, as means of bringing the tool pot holding the designated tool 13 to the tool removal station "P" where the tool is removed from the tool pot for use by the metal processing machine. As FIG. 1 demonstrates, a large number of tools can be stored in this type of tool magazine. Main indexing mechanism 15 is provided as means of rotating the main table in the direction shown by arrow "M" to an indexed position. In the same manner, sub-indexing mechanism 16 is provided as means of rotating a sub-table in the direction shown by arrow "N" to an indexed position. As will be explained subsequently, main and sub-indexing mechanisms 15 and 16 utilize roller gear cam driven reduction gearing and operate in response to positional monitoring signals.

Figure 5:
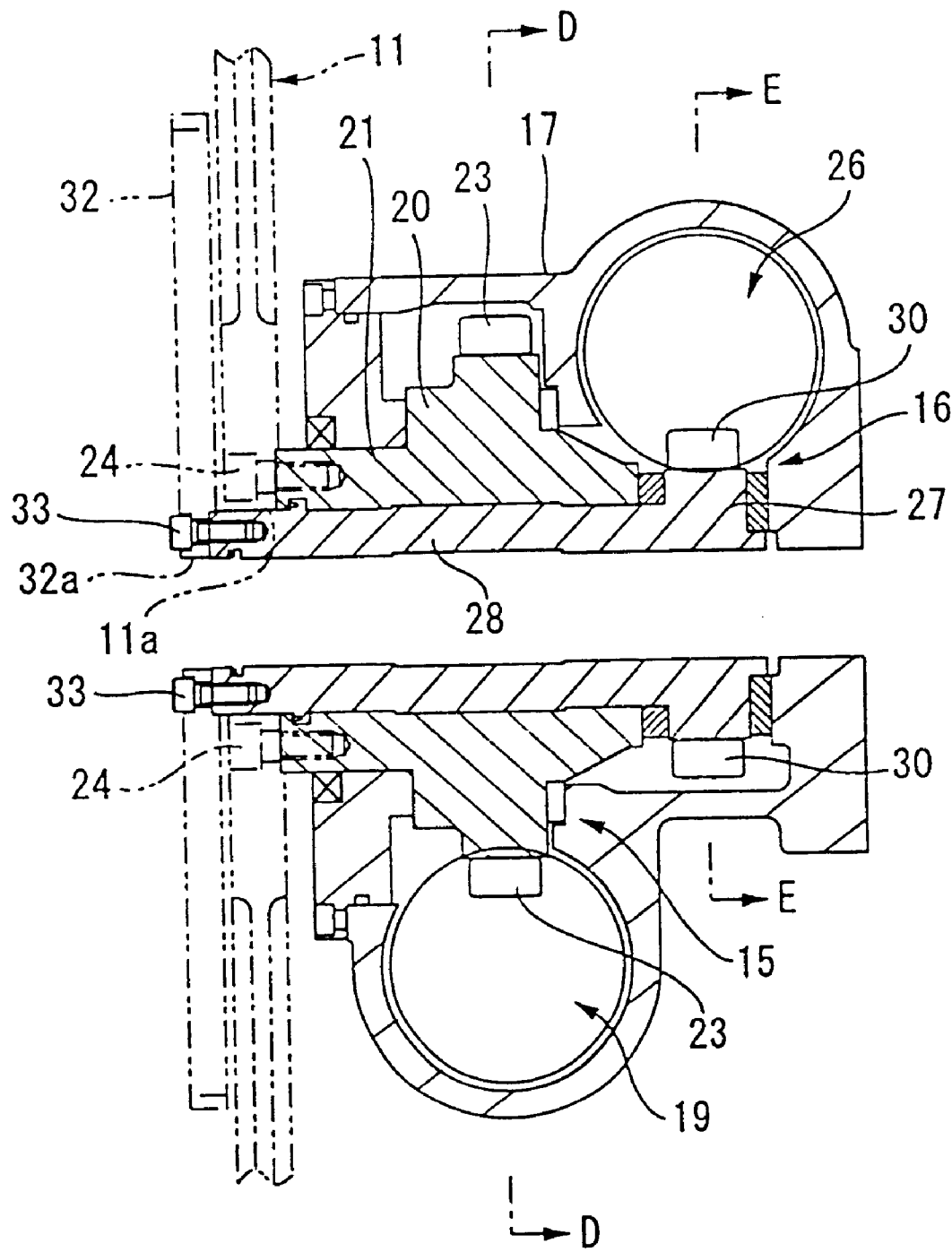
FIG. 5 is an enlarged view of the first and second indexing mechanisms of the first embodiment.
Figure 6:
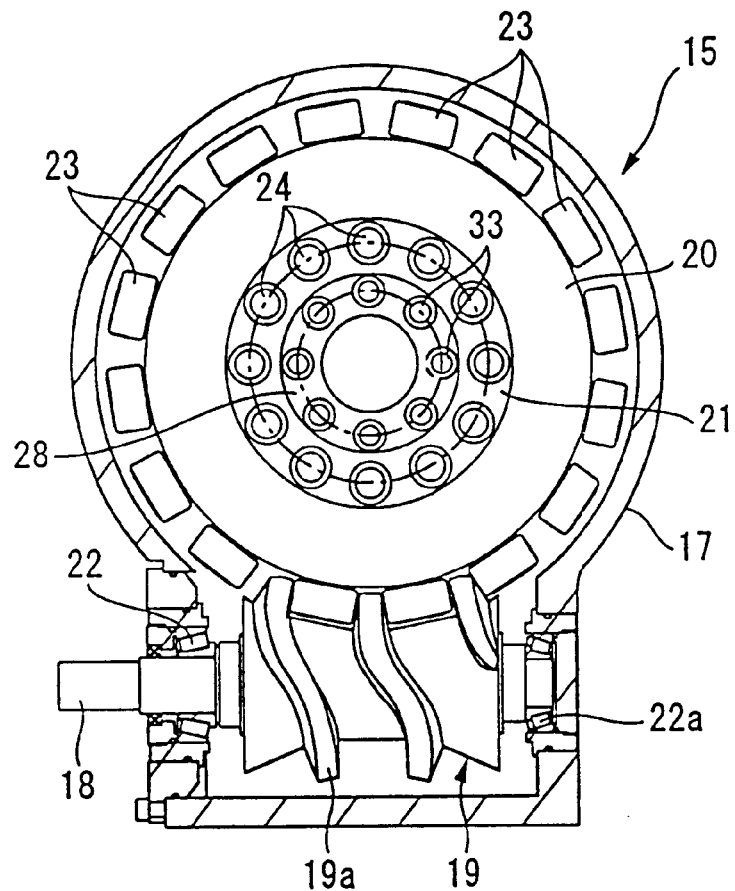
FIG. 6 is a cross sectional view of FIG. 5 at line D—D.

As shown in FIG. 5, first indexing mechanism 15 and second indexing mechanism 16 are structured as a single assembly whose output shafts rotate on the same axis. As shown in FIG. 6, housing 17 encloses first input shaft 18 which serves as the main input shaft, first roller gear cam 19, first turret 20, and first output shaft 21 which serves as the main output shaft. The axis of first input shaft 18 is oriented 90 degrees in relation to the axis of first output shaft 21, and is supported within housing 17 by means of bearings 22 and 22a. First roller gear cam 19 is a fixed, integral component of output shaft 18, and incorporates axially inclined spiral rib 19a on its radial periphery.

The axis of first turret 20, a disc-type structure immovably secured to first output shaft 21, is oriented at a 90-degree angle in relation to the axial centerline of first roller gear cam 19. Multiple cam followers 23, fixedly attached to the circumference of first turret 20 at uniform intervals, move between tapered ribs 19a on first output shaft 18 to form a spiral cam driven reduction gear mechanism. While not shown in the figures, a rotational angle positional sensor, encoder system, or similar electronic signal based position determination means is employed to control the angular phase changes of first indexing mechanism 15, first input shaft 18, and first output shaft 21. This type of rotational angle control system, which is also used with second indexing mechanism 16, is able to control the rotational angle of the indexing mechanism through a single control operation.

An electronically controlled cam-type indexing drive mechanism may be used in place of the aforesaid spiral cam driven reduction gearing as means of powering the aforesaid first indexing mechanism. Tapered rib 19a forms a continuous spiral cam lobe on first roller gear cam 19 and is used to control the position of first turret 20 in a repetitive start-stop operation. The aforesaid second indexing mechanism may also employ the aforesaid cam-type indexing drive mechanism.

First output shaft 21 is a hollow cylindrical structure whose end is fixedly attached to the radial center of main table 11 by means of bolts 24.

Figure 7:
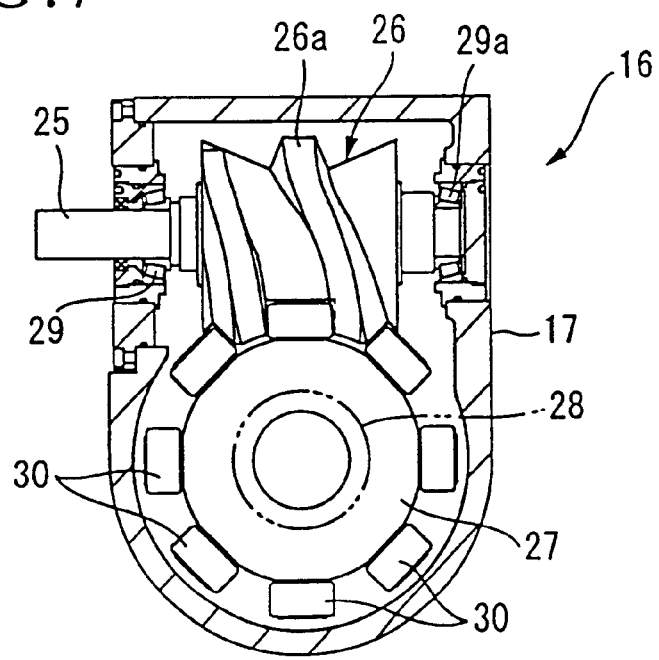
FIG. 7 is a cross sectional view of FIG. 5 at line E—E.

As shown in FIG. 7, second indexing mechanism 16 is basically of the same design as first indexing mechanism 15. As shown in FIG. 7, housing 17 encloses second input shaft 25 (which serves as the sub-input shaft), second roller gear cam 26, second turret 27, and second output shaft 28 which serves as the sub-output shaft. The axis of second input shaft 25 is oriented 90 degrees in relation to the axis of second output shaft 28, and is supported within housing 17 by means of bearings 29 and 29a. Second roller gear cam 26 is a fixed, integral component of second input shaft 25, and incorporates axially inclined rib 26a on its radial periphery.

Turret 27 is a disc-type structure immovably secured to second output shaft 28 whose axial centerline is oriented at a 90-degree angle in relation to the axial centerline of second roller gear cam 26. Multiple turret gear teeth 30 are fixedly attached to the circumference of first turret 27 at uniform intervals and insert between tapered rib 26a to form a roller gear cam driven reduction gear mechanism.

Figure 2:
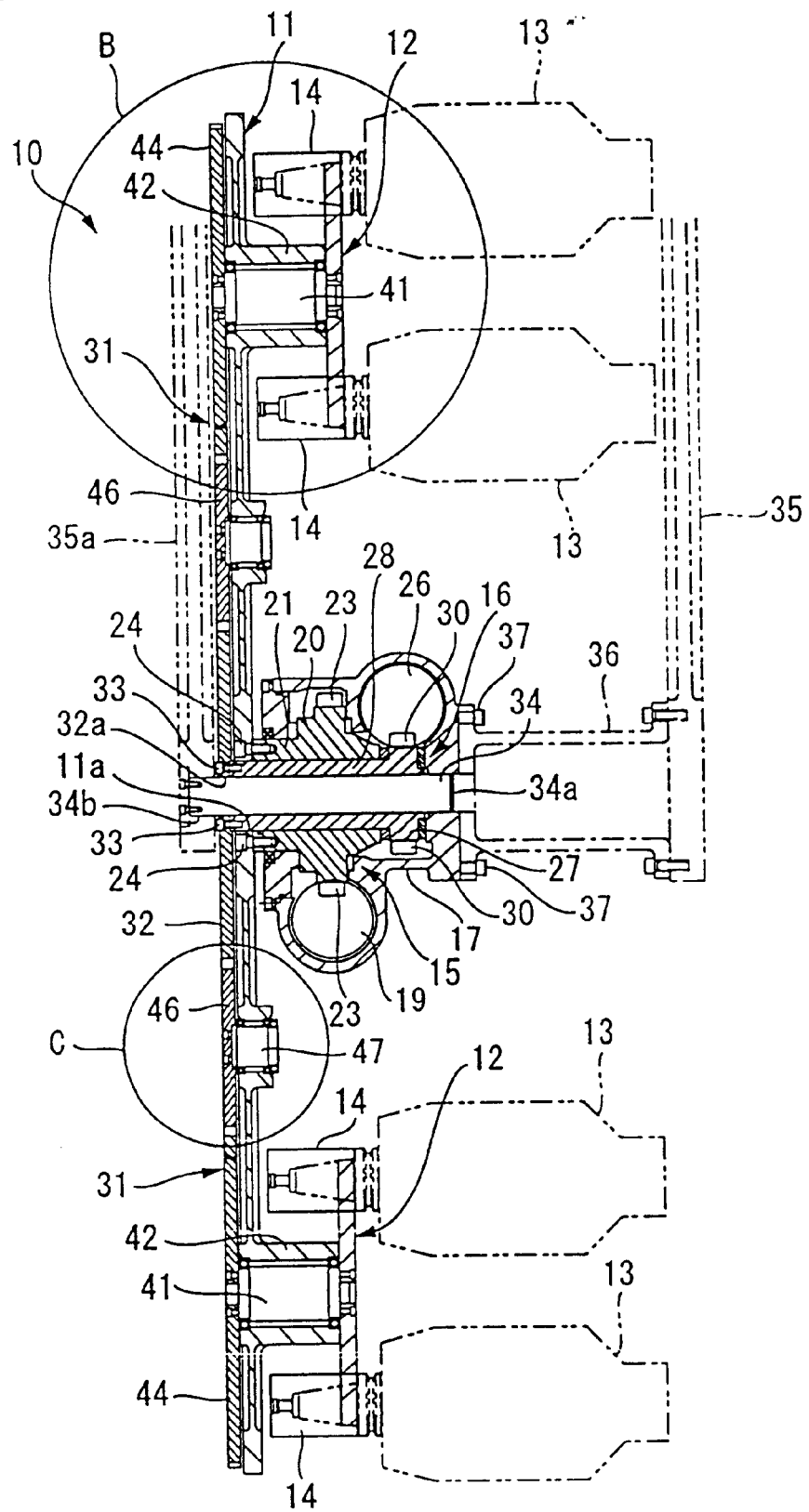
FIG. 2 provides a cross sectional view at line A—A of FIG. 1.

Second output shaft 28 is a cylindrical shaft that rotates within first output shaft 21. One end of second output shaft 28 runs through orifice 11a, located on the axial center of main table 11, and is attached to the axial center of sun gear 32 by means of bolts 33. Orifice 32a, formed to the approximate same diameter as the internal diameter of second output shaft 28, is provided at the axial center of sun gear 32. As shown in FIG. 2, end 34a of support shaft 34 is fixedly attached to one end of housing 17, and extends through the center of second output shaft 28 up and through axial orifice 32a so as to provide for their rotational support. Housing 17 is attached to pedestal 36 by means of bolts 37, pedestal 36 is attached to support frame member 35, and end 34b of support shaft 34 is attached to support frame member 35a as means of providing a support structure for tool magazine 10.

First indexing mechanism 15 is driven by a motor (not shown in the figures) through first input shaft 18, thus rotating tapered rib 19a which in turn rotates turret 20 in a specific direction through gear teeth 23, an action that results in the rotation of first output shaft 21 and main table 11.

Figure 3:
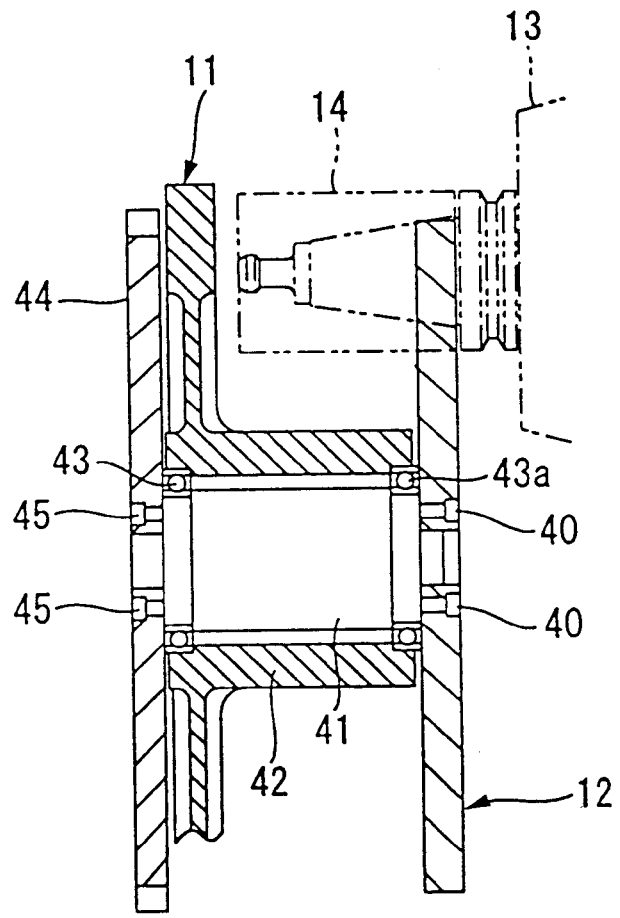
FIG. 3 is an enlarged view of part B of FIG. 2.
Figure 4:
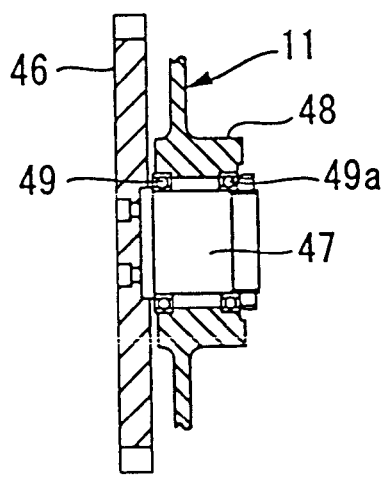
FIG. 4 is an enlarged view of part C of FIG. 2.

Sub-tables 12 are radially arranged around the circumference of sun gear 32. As shown in FIG. 3, sub-shaft 41 is fixedly attached to sub-table 12 at its axial centerline through bolts 40 and rotatably supported by bearings 43 and 43a. Bolts 45 are used to fixedly attach planet gear 44 to the end of sub-shaft 41 at its axial center, thus establishing the position of planet gear 44 in proximity to sun gear 32.

Idler gear 46 is installed between sun gear 32 and planet gear 44 so as to mesh with the teeth of both gears, thus forming planetary gearset 31 that is used to rotate sub-table 12 from the rotational torque supplied by second indexing mechanism 16. Idler gear 46 is supported by idler shaft 47 riding within bearings 49 and 49a, said bearings being installed in support boss 48 which is formed as an integral part of main table 11. As sun gear 32 and planet gear 44 have the same diameter and are rotatably driven by sun gear 32 through idler gears 46, they are able to rotate at the same speed and in the same direction as sun gear 32.

The tool magazine drive system delineated above allows first indexing mechanism 15 to rotate main table 11 while second indexing mechanism 16 rotates the sub-tables through planetary gearset 31.

The position of main table 11, indexed through first indexing mechanism 15, and sub-tables 12, indexed through second indexing mechanism 16, is determined through electrical signals output from positional sensors. As main table 11 and sub-tables 12 are able to rotate simultaneously, the rotation of main table 11 brings the designated sub-table to the tool exchange station while sub-table 12 rotates to bring the tool pot and tool 13 contained therein to the tool removal position "P". The rotation of sub-tables 12 can thus be synchronized with the rotation of main table 11.

In the first embodiment, main table 11 and sub-tables 12 rotate 45-degrees between each indexed position, a movement that always results in a tool pot coming to rest precisely at the tool removal station "P".

When the designated sub-table is stopped at the tool removal position, the tool pick-up arm (not shown in the figures) activates to extract the tool 13 held in the tool pot 4. When the machine is finished using the tool, the pick-up arm re-inserts the tool into the empty tool pot. The location of tool 13 may be determined through a matrix-type data memory that uses numbers assigned to the sub-tables and their tool pot positions. In this way the position of each tool can be kept track of on a real-time basis, thus allowing a specific tool to be extracted when required for the next machining operation.

The first embodiment puts forth a tool magazine structure in which multiple sub-tables are installed on a single disc-type main table and multiple tool pots are installed on each sub-table. This structure provides means whereby a large number of tools can be held on a single disc-type table. This first embodiment provides for a tool magazine capable of holding a total of 64 tools (eight sub-tables each carrying eight tools) in a relatively small space, thus allowing for more efficient space utilization in the factory where the machine is used.

Moreover, as this first embodiment prescribes a tool magazine structure in which the main and sub-tables are powered by roller gear cam reduction gearing, a smooth rotational movement is achieved to suppress vibrations that can be transferred to the metal processing machine when the tool magazine is in operation, vibrations that can have an adverse effect on the accuracy of the machining operation. Moreover, this type of drive system also reduces abrasional wear to significantly extend the service life of the tool magazine.

Furthermore, main table 11 and sub-tables 12 are rotationally indexed only to the extent required to bring the designated tool to the tool exchange station. The use of multiple sub-tables reduces the inertial effect because all of the tools need not be moved to bring one tool to the tool removal position. This type of structure allows the sub-tables to be rotated and stopped faster and more smoothly than can be done with a belt-type tool magazine, thus providing for a faster indexing movement, a benefit that translates into greater overall operating efficiency of the metal processing machine to which the tool magazine is installed.

Figure 8:
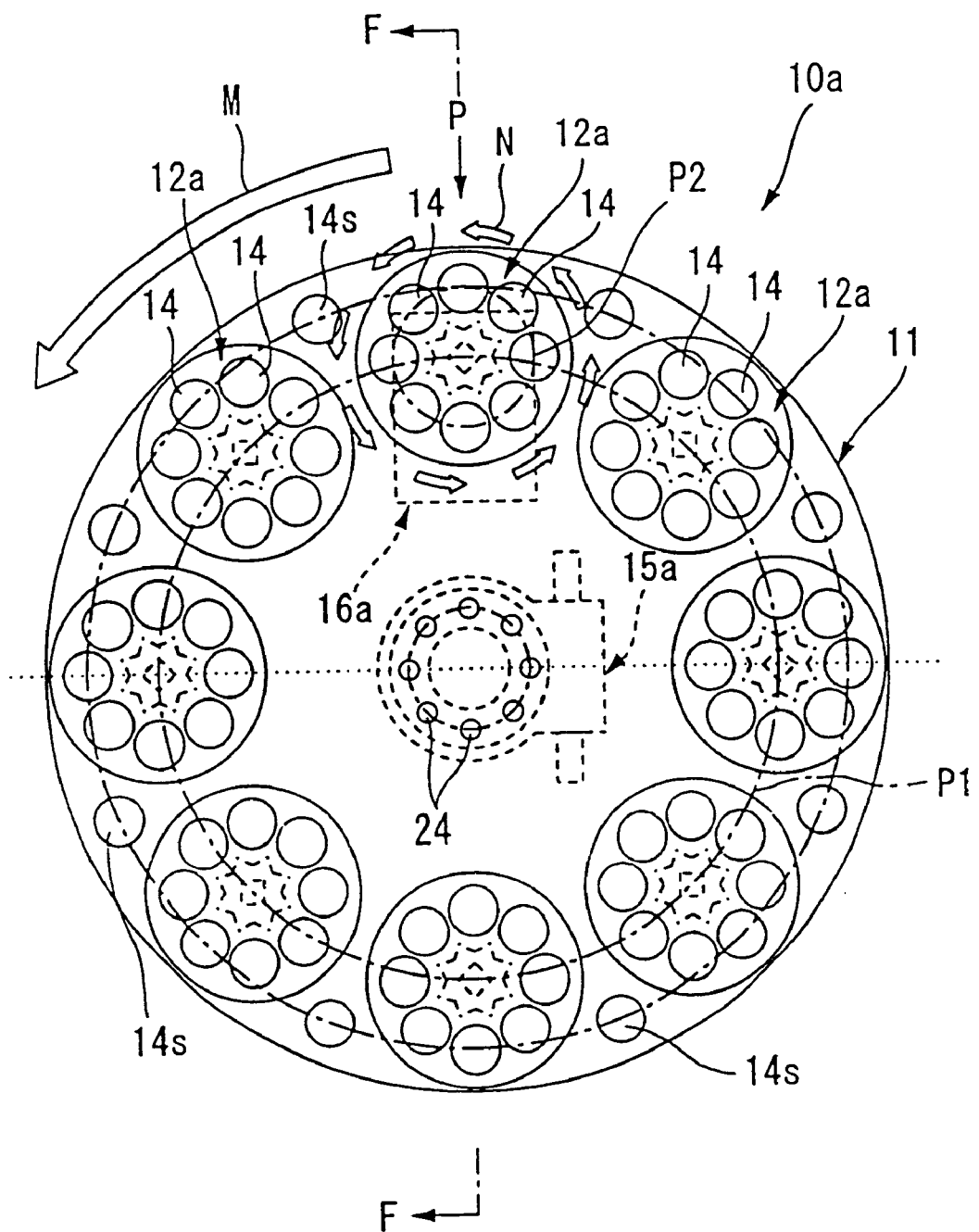
FIG. 8 shows a plan view of the second embodiment of the invention.
Figure 9:
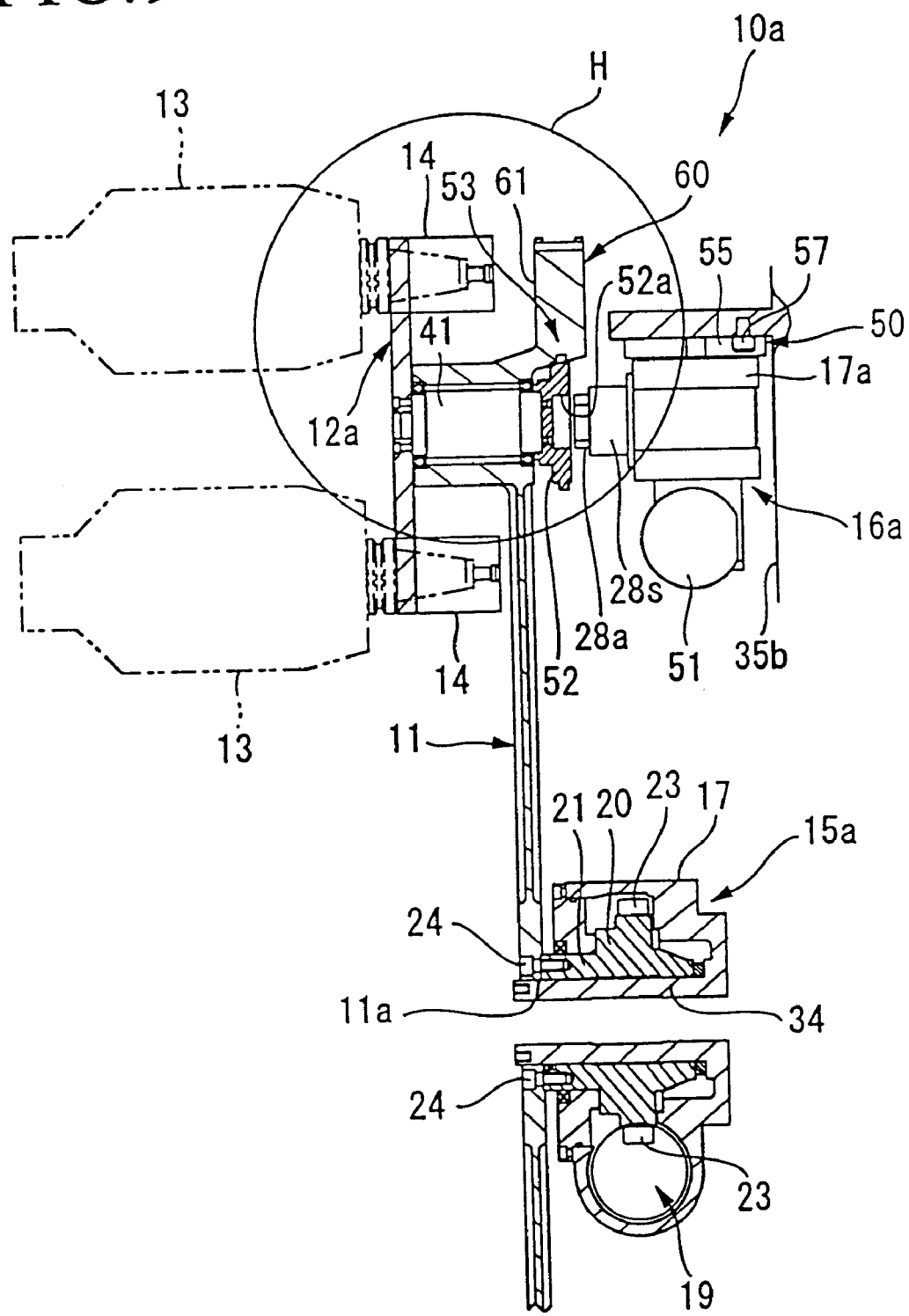
FIG. 9 is an enlarged cross sectional view of FIG. 8 at line F—F.
Figure 10:
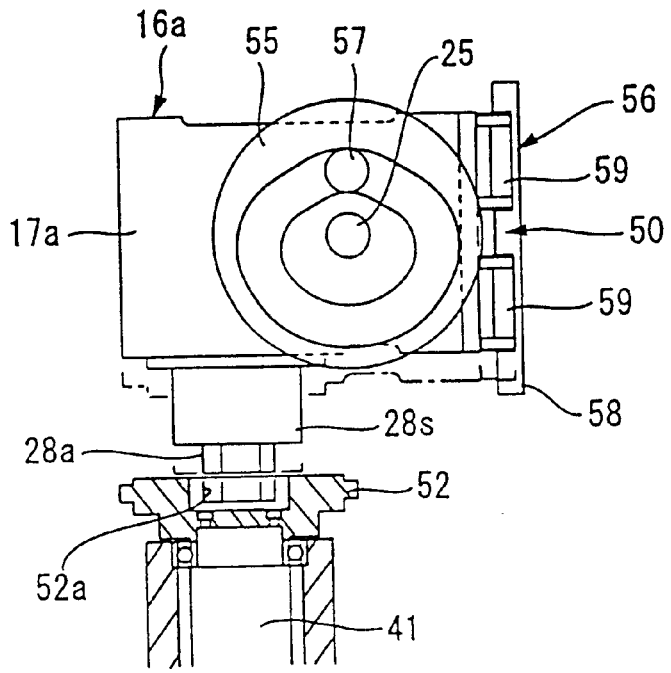
FIG. 10 is a partial frontal view of the second indexing mechanism of the second embodiment.

FIGS. 8 through 18 put forth a second embodiment of the invention. As shown in FIG. 8, tool magazine 10a provides some of the same structures as found in the first embodiment such as multiple sub-tables 12a being radially arranged on main table 11, and each sub-table being capable of carrying multiple tool pots. Main table 11 rotates in the direction shown by arrow "M" and sub-tables 14a rotate in the direction shown by arrow "N" to bring the designated tool to tool removal position "P". As shown in FIG. 9, the second embodiment provides for the following structures that differ from those provided by the first embodiment.

First indexing mechanism 15a is installed at the radial center of main table 11, and second indexing mechanism 16a is installed at tool removal station "P". Sub-table connecting device 50 is installed to second indexing mechanism 16a as means of axially connecting or disconnecting output shaft 28 of second indexing mechanism 16a to and from shaft 41 of sub-table 12a when sub-table 12a is at tool removal station "P".

This second embodiment provides for a structure in which first indexing mechanism 15a and second indexing mechanism 16a are two separate installed mechanisms. In this embodiment, first indexing mechanism 15a is comprised of a cam driven indexing mechanism. More specifically, as shown in FIG. 9, the roller gear cam driven indexing mechanism is comprised of first roller gear cam 19 immovably attached to the first input shaft (not shown in the figure), first turret 20 incorporating multiple cam followers 23 on its periphery, and first output shaft 21 formed as a fixed integral part of the first turret. The end of first output shaft 21 is fixedly attached to main table 11 through bolts 24, and housing 17 is attached to a support frame (not shown in the figure). Cylindrical support shaft 34 is formed as a fixed integral part of housing 17, and inserts within first output shaft 21 as means of supporting said shaft.

Second indexing mechanism 16a also utilizes a roller gear cam driven indexing mechanism. More specifically, second indexing mechanism 16a is enclosed within housing 17a and, as shown in FIGS. 10 through 15, is comprised of second roller gear cam 26 integrally formed to second input shaft 25, second turret 27 to which cam followers 30 are installed on a radial circumference thereon so as to rotatably mesh with the aforesaid second roller gear cam, and second output shaft 28s formed as in integral immovable part of second turret 27.

Figure 13:
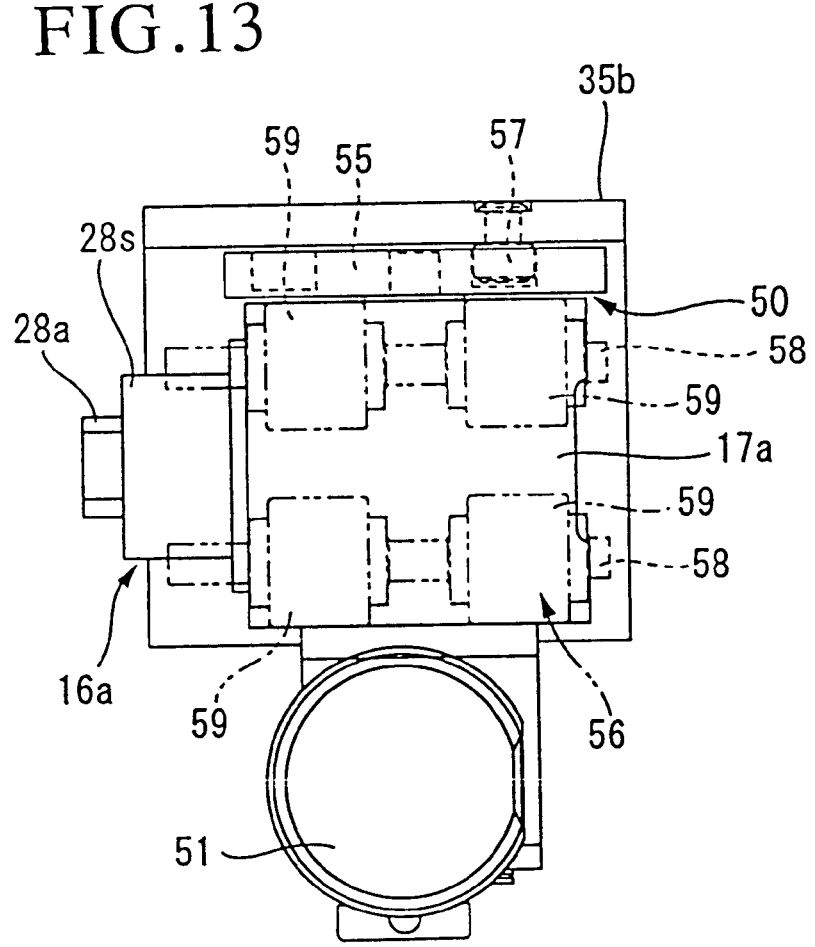
FIG. 13 is an enlarged side view of the second indexing mechanism shown in FIG. 10.

Housing 17a is movably supported by slide frame 35b through slide unit 56. Both ends of second input shaft 25 are supported by housing 17a through bearings 29 and 29a. Second input shaft 25 is driven by motor 51, and end part 25a of second input shaft 25 extends through one side of housing 17a (motor 51 is shown in FIGS. 11 and 13).

In this second embodiment, the rotational positions of first and second indexing mechanisms 15a and 16a are determined through electronically controlled roller gear cam driven reduction gearing as explained in the first embodiment.

Figure 11:
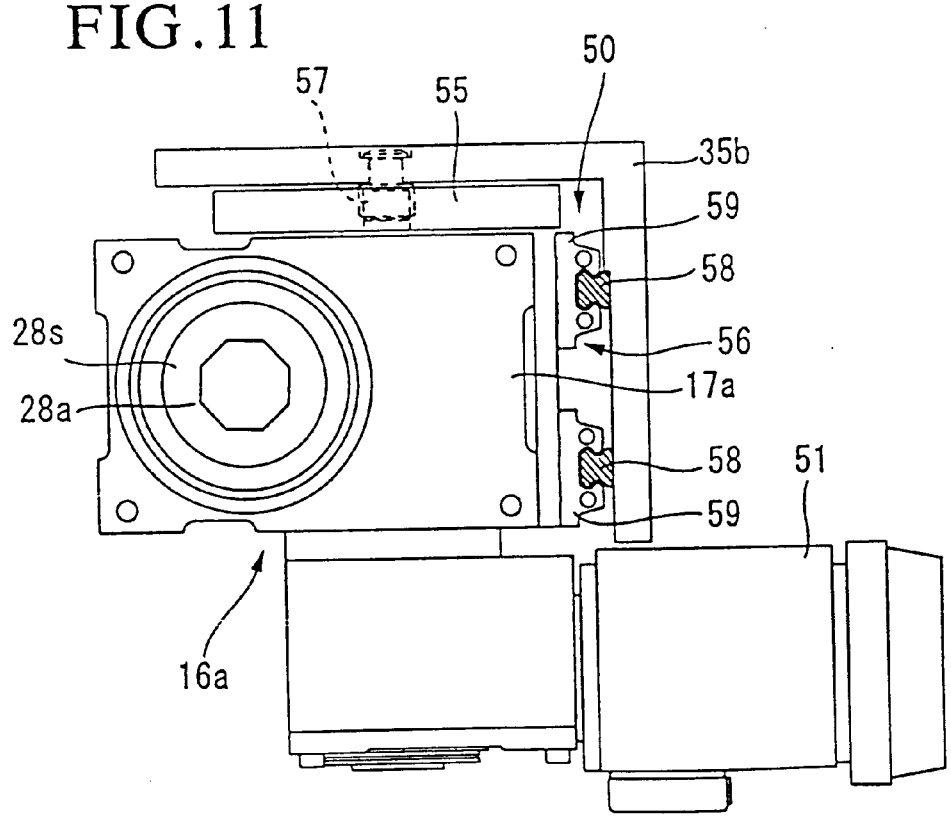
FIG. 11 is an enlarged frontal view of the second indexing mechanism shown in FIG. 10.
Figure 12:
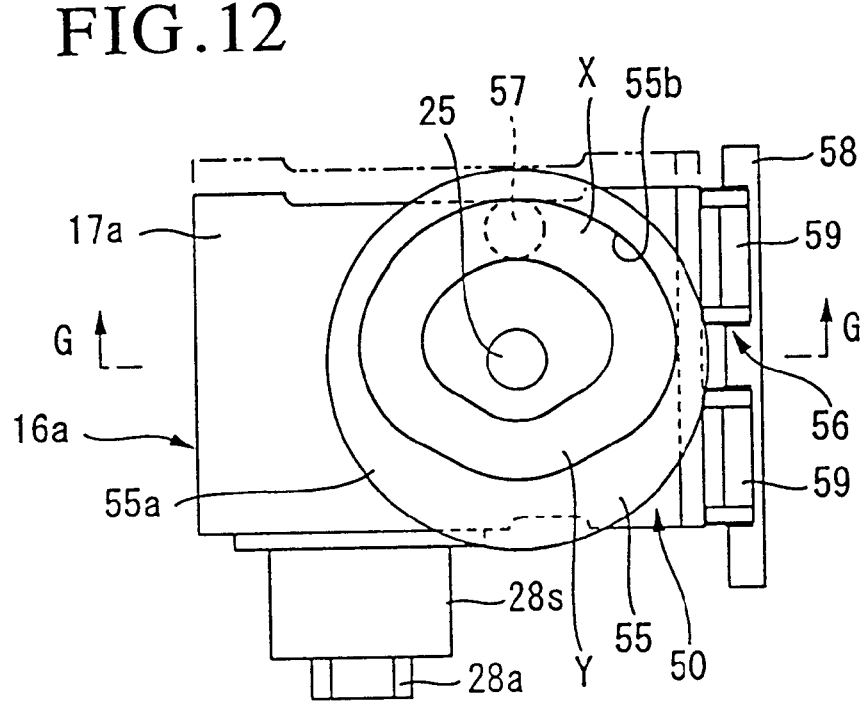
FIG. 12 is an enlarged partial frontal view of the second indexing mechanism shown in FIG. 10.
Figure 16:
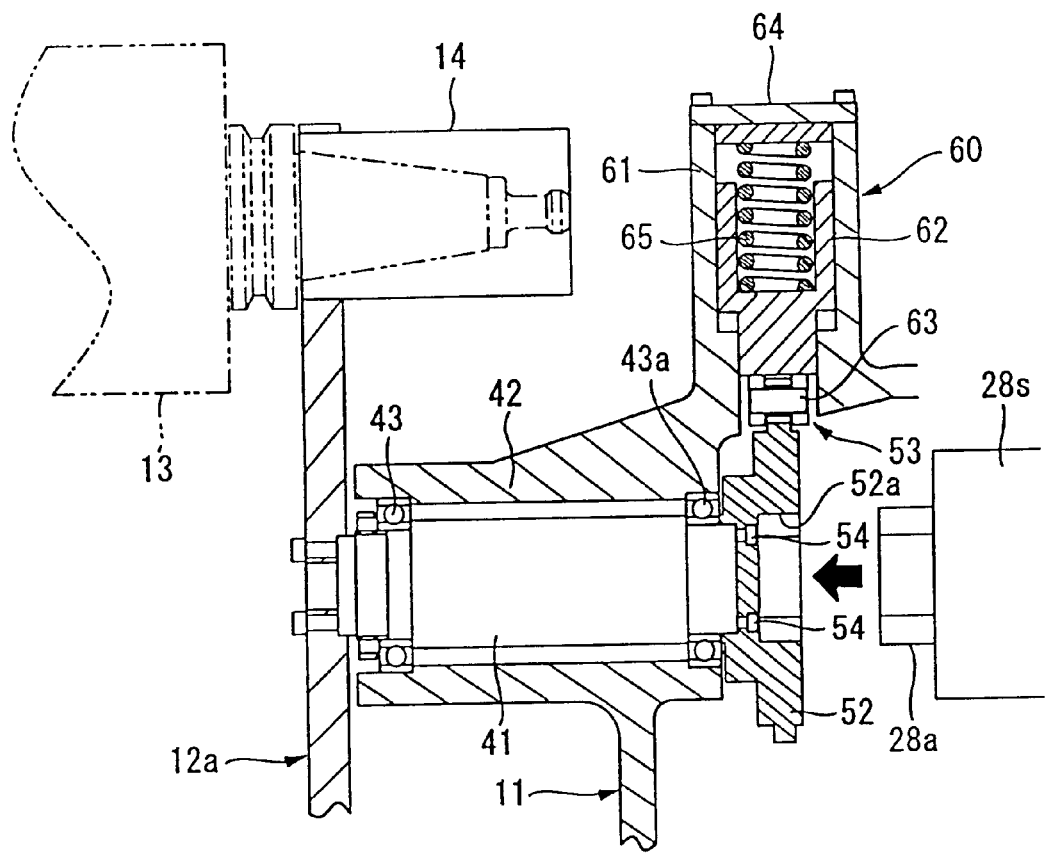
FIG. 16 is an enlarged cross section of FIG. 9 at line H.

Moreover, in this second embodiment, as shown in FIGS. 11 and 12, protruding angular joint nub 28a is formed on the end of second output shaft 28s. Nub 28a may be formed, for example, as a short angular pillar, octagonal in cross section, that is insertable to a corresponding octagon-shaped recess provided at the rear of each tool pot on the sub-table. As shown in FIG. 16, octagon-shaped recess 52a is formed on the end of rotating shaft 41 of the sub-table as means of creating a releasable joint which the sub-table may be connected to second output shaft 28s through the insertion of nub 28a into recess 52a. Indexing plate 52, within which recess 52a is formed, serves as the indexed part of indexing mechanism 53. The movement of nub 28a into an out of recess 52a is provided by a reciprocating connecting mechanism which will be discussed subsequently.

Figure 14:
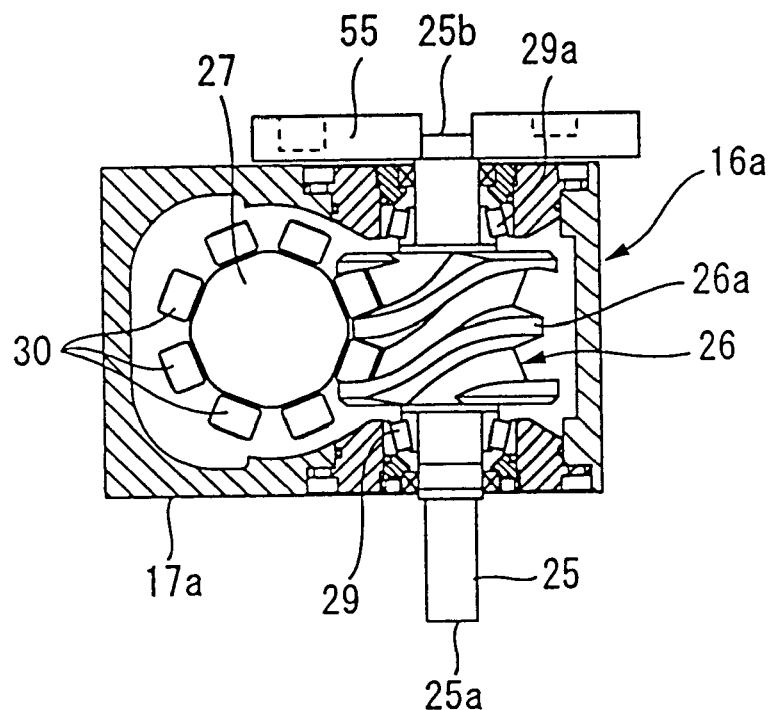
FIG. 14 is a cross section of FIG. 12 at line G—G.

As shown in FIGS. 11 and 14, a reciprocating cam mechanism is connected to shaft end 25b of second input shaft 25 that protrudes through housing 17a. This reciprocating cam mechanism incorporates a cam driven unit consisting of rotating channel cam 55 formed as an integral immovable component of input shaft 25, cam follower 57 that resides within the internally formed profile of channel cam 55, and slide unit 56 that supports the sliding action of housing 17a on slide frame 35b.

Figure 15:
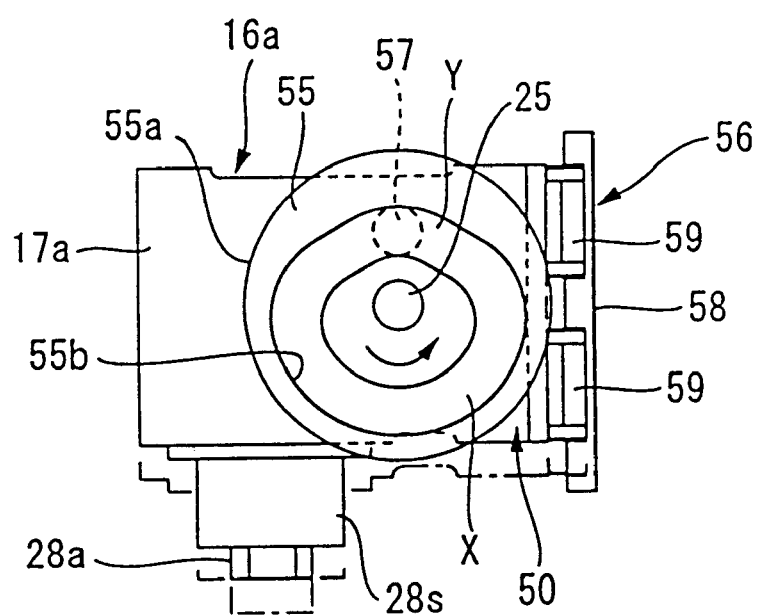
FIG. 15 is an enlarged partial front view of the second indexing mechanism in an extended position.

Channel cam 55 consists of an endless ellipsoidal cam channel 55b formed within the face of cam plate 55a. Cam channel 55b is formed to a profile that, when partially rotated, retracts second indexing mechanism 16a at point "X", and advances said mechanism at point "Y". Cam follower 57, fixedly installed to slide frame 35b, rides within cam channel 55b as a sliding connecting member between the second indexing mechanism and the channel cam. When second input shaft 25 turns channel cam 55 (as shown in FIG. 12), cam follower 57 moves to position "X" to withdraw angular nub 28a from recess 52a, thus separating the second indexing mechanism from the sub-table 12a. As shown in FIG. 15, further rotation of the second input shaft rotates the channel cam to move cam follower 57 to position "Y", thus inserting nub 28a into angular recess 52a as means of connecting the second indexing mechanism to the sub-table. The channel cam mechanism is thus capable of extending and retracting the second indexing mechanism through a reciprocating type of indexing movement.

As shown in FIG. 13, slide unit 56 is provided, said slide unit being comprised of two parallel sliding rails 58 attached to slide frame 35b in the same axial direction as second output shaft 28s, and two slider pieces 59 that are attached to housing 17 and ride within the two parallel sliding rails. Slide unit 56 is thus able to movably support the smooth linear sliding action of second indexing mechanism 16a.

One full revolution of second input shaft 25 results in one full revolution of channel cam 55. At the beginning of the indexing cycle, the indexing mechanism is in an advanced position with angular nub 28a inserted within recess 52a, a condition during which the second indexing mechanism simultaneously drives sub-table 12a through a single rotational indexing cycle. The further rotation of input shaft 25 then causes the second indexing mechanism to retract and separate from the sub-table by pulling angular nub 28a out of recess 52a. This reciprocating movement of angular nub 28a only takes place when it is desired to turn indexing plate 52 to positionally index the sub-table. When the sub-table is to be rotationally indexed 180-degrees, for example, four rotations of second input shaft 25 are executed as means of imparting four separate 45-degree rotational indexing cycles (a total of 180-degrees) to the sub-table. Each of these operating cycles consists of a compound movement in which linear coupling, rotation indexing, and linear release phases are executed in quick succession. Second input shaft 25 does not turn when no indexing action is required for the designated tool pot, that is, the time during which main table 11 is bringing the designated sub-table to tool removal station "P".

Figure 17:
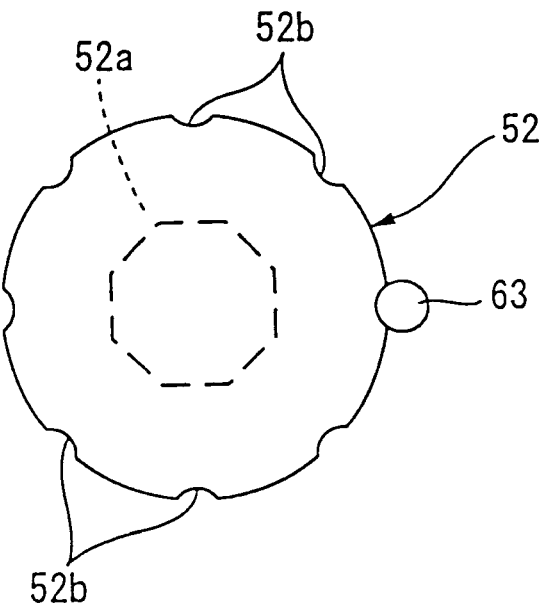
FIG. 17 is an enlarged view of the indexing plate used in the second embodiment.
Figure 18:
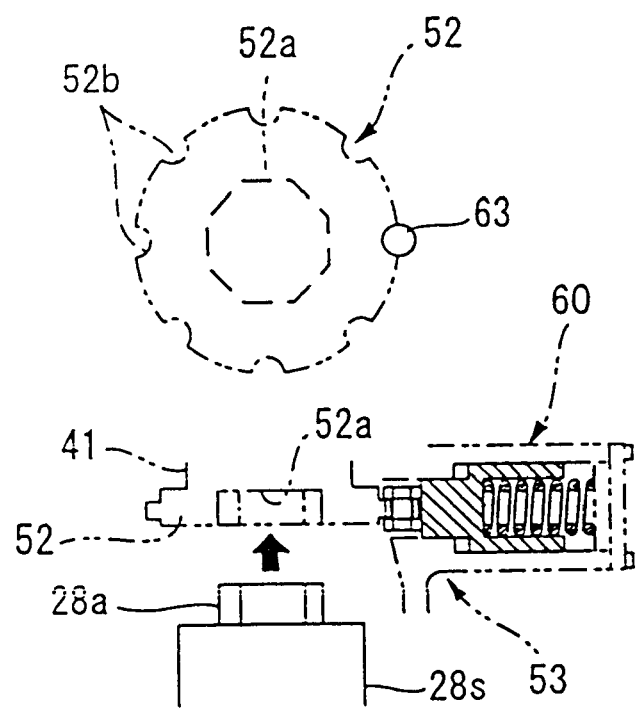
FIG. 18 is an enlarged view of the FIG. 17 indexing plate in an indexed position.

As shown in FIGS. 16 through 18, radial indexing mechanism 53 is installed to main table 11at at positions corresponding to each sub-table 12a. Each radial indexing mechanism 53 is comprised of indexing plate 52, and stop position control device 60 whose function is to establish the rotational stop positions of the indexing plate.

As shown in FIG. 17, indexing plate 52 is formed as a solid disc-type structure that incorporates multiple notches 52b formed on its radial perimeter. In this embodiment, the indexing plate incorporates eight uniformly spaced notches, each notch corresponding to a tool pot position on the sub-table.

As shown in FIG. 16, the aforesaid alignment device 60 is comprised of indexing shaft 41 that resides within boss 42, cylindrical part 61 formed as an integral extending component of boss 42, sliding block 62 whose function is to slide within cylindrical part 41 as means of pressing follower 63 against notches 52b on the perimeter of indexing plate 52, and spring 65, installed in a compressed condition within cylinder 61 between housing 17 and sliding block 62, as means of maintaining follower 63 in contact with indexing plate 52.

Radial indexing mechanism 53 provides a structure that makes it possible to precisely align tool pot 14 (on sub-table 12a) with the pick-up mechanism at the tool removal position, thus enhancing the precision of the tool exchange operation. Moreover, this type of radial indexing mechanism also eliminates the problem of the sub-tables vibrating while main table 11 is in motion, and stabilizes the sub-tables so that tools can be easily replaced at positions other than at tool removal station "P".

The radial angle of each notch 52b is equivalent to the desired radial angle of tool pot 14 at tool removal station "P", thus providing for a mechanism that precisely determines the angular position of the sub-table. Moreover, as shown in FIG. 18, the angular shape of nub 28a and corresponding shape of recess 52a provide for a highly precise positioning of the releasable joint formed between the two components.

When it becomes necessary for second indexing mechanism 16a to execute the rotational indexing action, motor 51 activates to turn second input shaft 25 which turns second output shaft 28s as means of providing power for the rotational indexing action. The rotation of second output shaft 28s powers two separate movements during the indexing operation, moving second indexing mechanism 16a in a linear path to form a connection with sub-table 12a through connecting device 50 while simultaneously rotating sub-table 12a to perform the rotating indexing operation.

The entire tool indexing operation is executed as follows.

1. First indexing mechanism 15a turns main table 11 to bring the designated sub table 12a to the tool exchange station.

2. Second indexing mechanism 16a advances and connects with sub-table 12a through the insertion of angular nub 28a into recess 52a.

3. Second indexing mechanism 16a rotates sub-table 12a to the next indexed position after which second indexing mechanism 16a retracts.

4. Operations 2 and 3 repeat until sub-table 12a is brought to the desired indexed position.

After the indexing operation has completed, the position of tool pot 14 is maintained in precise alignment at the tool exchange position through the operation of radial indexing mechanism 53 while second indexing mechanism 16a retracts to release the joint between angular joint nub 28a and recess 52a. Steps 1 through 4 above repeat whenever a tool exchange operation is executed.

In this second embodiment, the installation of eight sub-tables 12a to the main table 11 at uniform angular intervals allows for a sub-table to be rotationally indexed to the tool exchange position through a 45-degree rotation of the main table. Moreover, the radial arrangement of eight tool pots 14 on each sub-table 12a at uniform angular intervals allows each tool pot to be brought to the tool removal position from a 45-degree rotational segment of the sub-table. Accordingly, this design provides for a structure capable of bringing a tool pot to the tool removal position through one operational cycle of the main table and a sub-table.

This second embodiment further provides for a tool magazine structure to which a matrix-type tool memory can be employed to keep track of the position of the tools on the sub-tables, and thus provides for the same type of tool management technique applicable to the first embodiment. This second embodiment provides for a structure whereby only the sub-table 12a at the tool exchange position need be rotationally indexed while the other sub-tables remain stationary in relation to the main table 11.

This second embodiment provides for a structure in which radial indexing device 53 is connected to rotatable sub-shaft 41 of sub-table 12a as a way to accurately establish the stop positions of the sub-table, thus providing means of precisely indexing the sub-table at the tool exchange position. In addition, angular nub 28a and corresponding recess part 52a provide for a releasable joint that, when connected, is capable of precisely positioning the sub-table at the tool exchange position.

Figure 19:
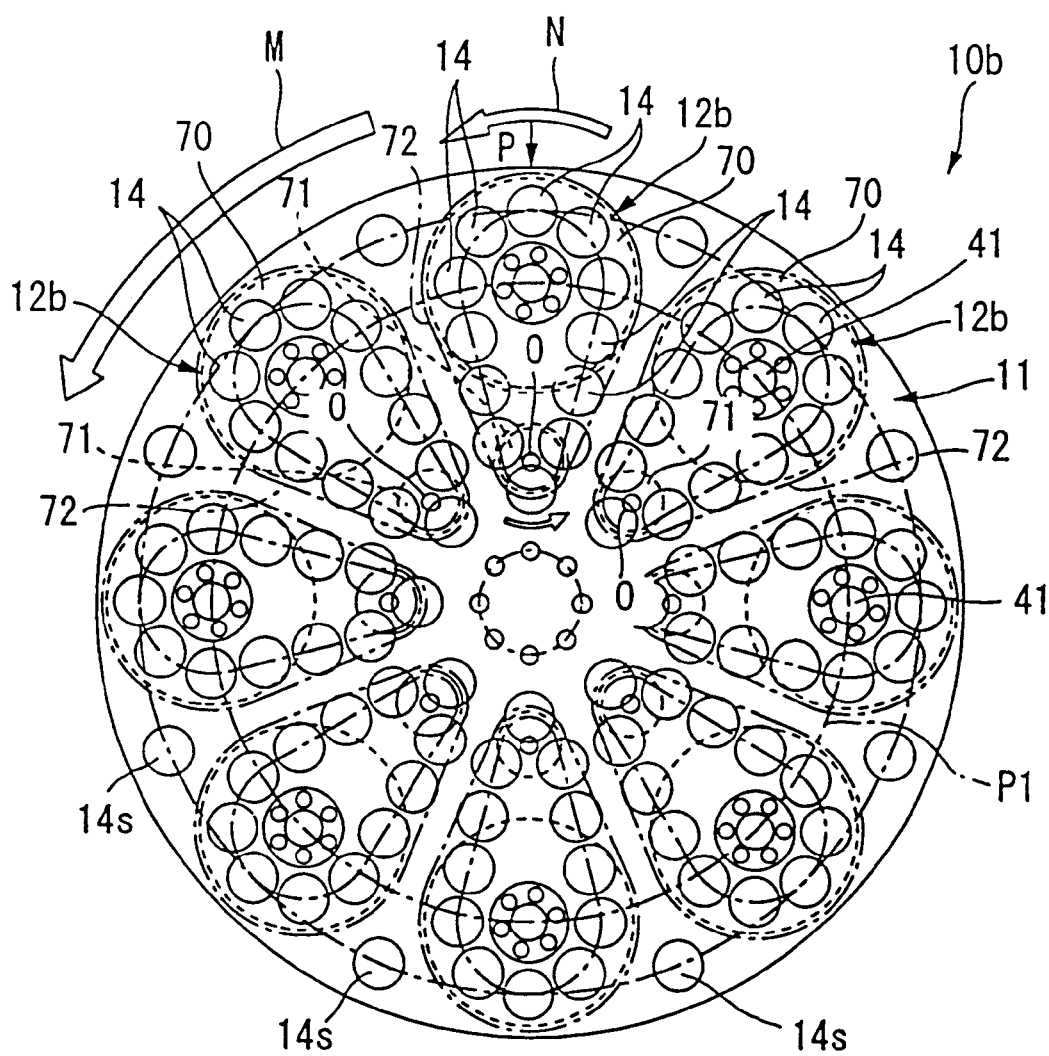
FIG. 19 is frontal view of the third embodiment of the invention.

FIG. 19 demonstrates a third embodiment of the invention in which tool magazine 10b is similar to the first and second embodiments in regard to the following structures. Multiple sub-tables 12b, on which tool pots 14 are installed, are arranged in a radial pattern on main table 11, sub-tables 12b being angularly rotatable to a desired position as means of providing a tool indexing movement that is able to bring a designated tool 13 (residing in tool pot 14) to tool removal station "P" for removal. This third embodiment differs from the first and second embodiments in the following structures. Drive parts 70 are fixedly installed to the perimeter of each sub-table 12b, thus allowing the rotating movement of each sub-table to be transferred to sub-shaft 41. Driven parts 71 are rotatably mounted to an inner diameter of main table 11 in a uniform radial pattern at points "O", and belt part 72, to which multiple tool pots 14 are installed, is placed around drive part 70 and driven part 71 so as to rotatably connect said parts.

The aforesaid drive part 70 and driven part 71 may be structured, for example, in the form of sprockets as means of providing a secure non-slipping connection with belt part 72. Belt part 72 may be structured as a chain, for example, or any other type of structure able to mesh with and move between drive part 70 and driven part 71 without stretching or compressing. The rotational movement of drive part 70 drives belt part 72 in the direction of arrow "N" (shown in FIG. 19). Drive part 70 imparts movement to belt part 72, thus moving tool pots 14 around sub-table 12b and driven part 71.

Drive part 70 is rotated by rotational torque supplied by second indexing mechanism 16 or 16a through structures that were explained previously in the first and second embodiments respectively. Drive part 70 may be rotated by planetary gearset 31 as put forth in the first embodiments, or by cam-driven connecting device 50 as put forth in the second embodiment. Main table 11 may be driven by first indexing mechanism 15 or 15a as put forth in the first and second embodiments respectively.

In this third embodiment, the rotational indexing movement of main table 11 brings each sub-table 12b to tool removal station "P" where the main table temporarily stops. With main table 11 stationary, belt part 72 moves to bring the designated tool pot 14 to tool removal station "P". While this movement provides the same tool indexing function as explained in the first and second embodiments, this third embodiment presents a structure whereby an increased number of tool pots 14 can be carried by the tool magazine. In the example presented by this third embodiment, each of the 8 sub-tables is able to carry 12 tool pots, thus providing for a total tool magazine capacity of 96 tools. Therefore, this structure provides means by which the tool magazine can carry even more tools in the same space.

In all of the presented embodiments, sub-tables 12, 12a, and 12b are spaced so as to avoid their mutual interference. This spacing allows for the installation of additional tool pots 14s between the sub-tables at positions able to align with tool removal station "P", thus providing for a tool magazine structure able to hold an even greater number of tools, among which can be oversize tools that cannot be held by the sub-tables. Utilizing this structure, main table 11 can be structured to provide 16 indexed stop positions at the tool removal position. In this case, first indexing mechanism 15 and 15a would be structured to provide indexing stops every 22.5-degrees. Moreover, an indexing operation for a tool mounted directly to the main table would require no movement of the sub tables.

Figure 20:
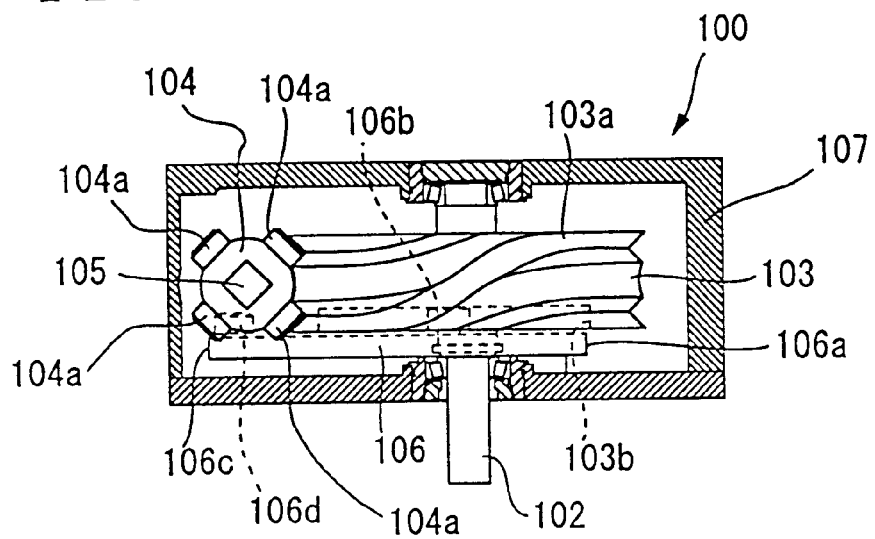
FIG. 20 is a partial frontal cross section of a type of second indexing mechanism of appropriate use with the invention.
Figure 21:
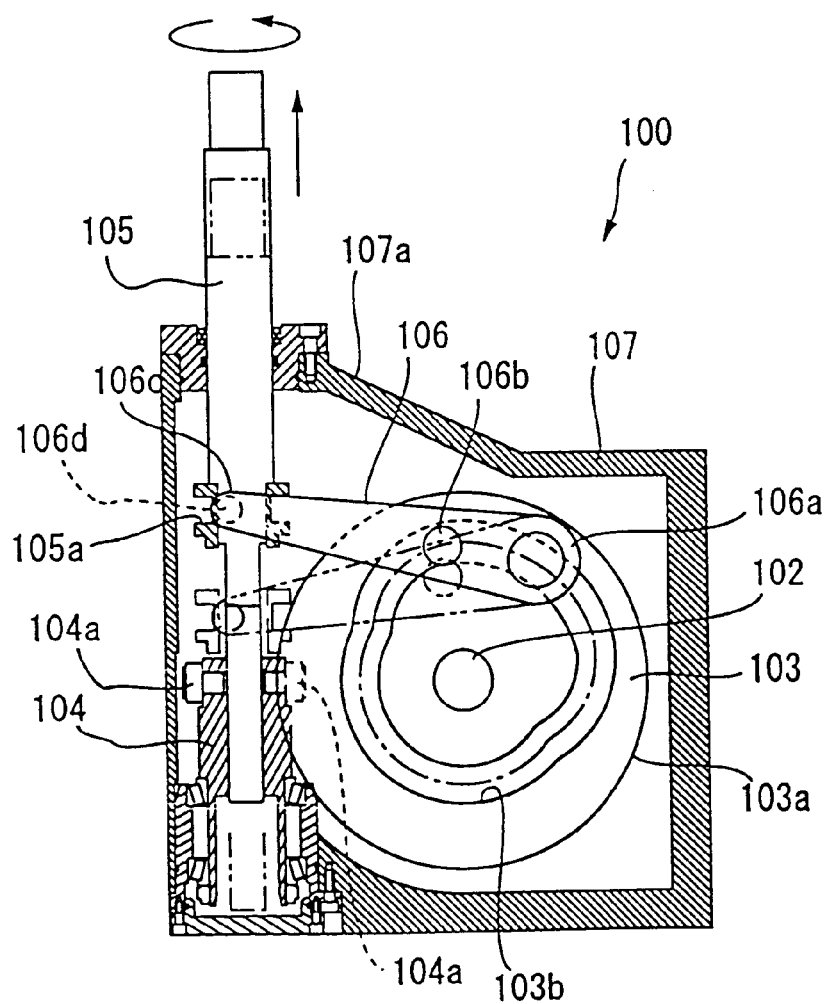
FIG. 21 is a frontal cross section of the second indexing mechanism shown in FIG. 20.

As shown in FIGS. 20 and 21, a conventional cam-driven pick and press unit or automatic tool changer, compound cam mechanisms that are currently known in the art, can be applied to second indexing mechanism 16a as means of powering connecting device 50. This type of compound cam mechanism allows the rotating movement of an input shaft to be converted into a compound rotational indexing and reciprocating linear movement of an output shaft. It is thus able to provide the reciprocating linear movement of the aforesaid second output shaft as means of connecting the second indexing mechanism to the sub-table while also providing the rotational movement applied to index the sub-table.

The aforesaid compound cam mechanism is utilized in second indexing mechanism 100 shown in FIGS. 20 and 21 in which roller gear cam 103 is driven by the rotation of input shaft 102. The rotation of roller gear cam 103 generates an indexing movement of turret 104 by means of a power transfer path provided by cam followers 104a following the rotating contour of taper rib 103a. Output shaft 105, which corresponds to the aforesaid second output shaft, is connected to turret 104 by means of a splined joint, and is rotationally driven by turret 104 while simultaneously moving with a reciprocating motion in the axial direction. The structure delineated above comprises the aforesaid first cam mechanism.

Cam channel 103b is formed on the lateral face of roller gear cam 103. Torque provided by input shaft 102 results in a reciprocating movement of swing arm 106 generated by a cam follower that maintains one part of swing arm 106 within cam channel 103b. One end of swing arm 106 is connected to output shaft 105 as means of imparting a reciprocating movement to output shaft 105 in the axial direction. This structure delineated above comprises the aforesaid second cam mechanism.

The aforesaid structures provide a mechanism through which output shaft 105 is connected to input shaft 102 by means of a compound power transfer path comprised of turret 104 and swing arm 106, thus resulting in the torque supplied by input shaft 102 being converted into simultaneous rotational and axial movements of output shaft 105. These rotational and axial movements serve as the respective rotational and linear movements of the aforesaid second output shaft of the aforesaid second indexing mechanism as explained by the embodiments of the invention.

What is the claimed is:

1. A tool magazine comprising;
   a positionally indexable main table rotatably attached to a support frame; multiple sub-tables rotatably attached to the main table in a radial pattern and capable of rotating to indexed positions;
   multiple tool pots, to which machining tools can be inserted and removed, attached to said sub-tables in a radial pattern;
   multiple planet gears, each planet gear is connected to a respective sub-table;
   multiple idle gears, each idle near is connected to a respective planet gear;
   a sun gear which is connected to each of said idle gears, is installed at the center of a circular path along which said sub-tables move as a result of the rotation of said main table and which transfers rotational torque to each of said idle gears;
   a main indexing mechanism connected to the main table as means of rotationally indexing the main table with the purpose of transporting one of said sub-tables to an indexed tool removal position; and
   a sub-indexing mechanism which is connected to said sun gear and which transfers rotational torque to said sun gear as means of rotationally indexing one of said tool pots to the tool removal position;
   wherein, said sun gear is located at the center of said main table, said idle gears are located outside said sun gear in the direction of a radius of said main table, and said planet gears are located outside said idle gears in the direction of a radius of said main table.

2. A tool magazine as claimed in claim 1 wherein said sun gear and
said planet gears move in the same direction, and have the same diameter so that both gears rotate at the same speed.

3. A tool magazine comprising;
   a positionally indexable main table rotatably attached to a support frame;
   multiple sub-tables rotatably attached to the main table in a radial pattern and capable of rotating to indexed positions;
   multiple tool pots, to which machining tools can be inserted and removed, attached to said sub-tables in a radial pattern;
   a main indexing mechanism connected to the main table as means of rotationally indexing the main table with the purpose of transporting one of said sub-tables to an indexed tool removal position; and
   a sub-indexing mechanism capable of connecting to and disconnecting from one of the said sub-tables; connecting to one of the said sub-tables and transferring rotational torque to one of said sub-table sub-tables as means of rotationally indexing one of said tool pots to the tool removal position, at the time that one of said sub-tables reaches the tool removal position by a rotation of the main table, and disconnecting from the sub-table, at the time that the main table rotates;
   wherein;
      a radial indexing mechanism is installed on said main table at each sub-table location as means of maintaining an indexed position of the corresponding sub-table, and said radial indexing mechanism incorporates a radial indexing part immovably attached to said sub-table, and a stop position control device installed to said main table as means of joining with the indexing part to establish and an indexed position of said; and
      said stop position control device incorporates a sliding block that forms a releasable joint with said radial indexing part, and a compressible element installed to said main table, said compressible element providing a compressive force through which said sliding block is held against said radial indexing part.

\* \* \* \* \*